United States Patent [19]
Janky

[11] Patent Number: 5,914,941
[45] Date of Patent: Jun. 22, 1999

[54] PORTABLE INFORMATION STORAGE/ PLAYBACK APPARATUS HAVING A DATA INTERFACE

[75] Inventor: James M. Janky, Los Altos, Calif.

[73] Assignee: Information Highway Media Corporation, Cupertino, Calif.

[21] Appl. No.: 08/450,818

[22] Filed: May 25, 1995

[51] Int. Cl.⁶ .................................................. G11B 20/10
[52] U.S. Cl. ..................................... 370/313; 395/200.49
[58] Field of Search .................................. 348/7, 12, 13; 364/514 R, 400.01; 395/200.49; 370/313

[56] References Cited

U.S. PATENT DOCUMENTS

| | | | |
|---|---|---|---|
| 5,440,336 | 8/1995 | Buhro et al. | 348/13 |
| 5,541,638 | 7/1996 | Story | 348/7 |
| 5,557,541 | 9/1996 | Schulhof et al. | 364/514 R |

*Primary Examiner*—Min Jung
*Attorney, Agent, or Firm*—Michael A. Glenn

[57] ABSTRACT

A digital replacement for an analog audio tape recorder can record audio programming digitally in a faster than real time format and can play back audio programming, where such programming has been digitized and stored in data files using a variety of compression/decompression algorithms. Audio programming is stored digitally on a non-volatile medium, such as a hard drive, or in a flash EPROM, or other solid state non-volatile memory. The device includes a hard drive, a modem for connection to a data base via an on-line service, a keyboard, a display, and an audio system. The device uniquely combines the remote data access capability resident in a personal computer with a set of tailored, streamlined control functions to simplify, automate, and render seamless the process of selecting audio program material; ordering the program material from a service; receiving acknowledgment of the order and receiving the program material via automatic download for storage in a hard drive; playback of the program material when and where the user desires, with fully streamlined control functions; and control of the user interface functionality on the keyboard through a setup mode of operation.

18 Claims, 5 Drawing Sheets

PORTABLE INFORMATION STORAGE/PLAYBACK APPARATUS HAVING A DATA INTERFACE

BACKGROUND OF THE INVENTION

1. Technical Field

The invention relates to the distribution of subscription and on-demand audio program material. More particularly, the invention relates to high speed recording of audio program material from a remote source on a subscription and/or on-demand basis using a portable high capacity audio recording and playback device.

2. Description of the Prior Art

Although much neglected by the public and the press in connection with the current fascination with pay-for-view movies, video-on-demand, and other multimedia services, sound remains the most compelling and informative element in any form of interpersonal or electronic communication. To understand this concept better, consider a television network news broadcast. If the picture portion of the broadcast is lost, one is still able to receive most of the content of the broadcast. However, if the audio portion of the broadcast is lost, one receives almost none of the content of the broadcast.

Radio was the most highly successful entertainment medium until sound motion pictures and television added the visual element to entertainment programming. The state of radio today is such that it provides a source of music, as well as talk and news, especially for those environments that require some level of visual concentration, such as operating a vehicle or machinery, or working in an office. Thus, radio has been pushed into the background as an ancillary form of entertainment.

One can listen to a radio and hear whatever is being broadcast at the time; or one can record a desired piece of music or other program as it is broadcast, and listen to the recording later, for example on an automobile cassette player. One can also transport prerecorded audio program materials, such as tapes and compact disks, and listen to them in the car or on a portable playback device, such as a Walkman®. Prerecorded audio programming that is available includes music, books on tape, and various educational and entertainment materials.

All known audio program delivery methods have been generally accepted by the public, but they are somewhat limited in their appeal because they are time-consuming to prepare, for example making a recording for later use is time consuming because the recording must be made in real time. They are expensive, for example a compact disk containing a musical performance or a book on tape may only be listened to once or twice, although the full purchase price must be paid for such materials. And they do not offer the variety of program material that is either now available from television cable services, or that is available from other media, such as print media, for example the New York Times or the Wall St. Journal.

There are other significant limitations inherent in an off-the-air recording system that include a lack of control of the choice of program material, and the time at which the subscriber can listen to this material. In current radio broadcast systems, the program material is broadcast when the station manager thinks it best. Such real time distribution requires that interested listeners tune in at the designated time, assuming that the station is willing or able to publicize its broadcast schedule in advance of the broadcast. Even so, a listener must typically endure several annoying interruptions for commercial messages, even if listening to the so-called public radio stations. Prerecorded materials are packaged by the manufacturer and must be used in the format provided, i.e. all of the materials must be listened to in the order they were recorded. Otherwise, the consumer must rerecord the prerecorded materials to edit the content and/or order of the materials, as well as adding other materials that were not included by the manufacturer f the prerecorded programming. As discussed above, the recording process is time consuming, requires a certain level of patience and skill, and is a significant barrier to use for the typical listener.

Thus, those persons listening to a broadcast while in their automobiles have less control because they cannot time shift a program by recording the program, although they may nevertheless want to listen to certain programs while traveling. Additionally, those persons listening in the automobiles may want to listen to program material that is not normally available on a public broadcast channel. While those persons listening in their automobiles may listen to recordings that they have purchased or recorded themselves when the program material was originally broadcast, the mobile listener cannot take control of the program selection process and the time at which the program is heard, nor can such materials be combined or edited without a significant commitment of the listener's time to assembling the desired materials, or portions of the desired materials, in the desired order.

The most limiting factor in the expansion of audio related news and entertainment services is probably the lack of program material having the form and content desired by the subscriber, coupled with the lack of a modern customer order and distribution system for such materials for conveniently delivering the program materials in the desired format.

The video-on-demand industry is just evolving. However, the video-on-demand industry has a fundamentally different focus than that of radio or other audio-based program delivery services, i.e. to duplicate a theater-like experience in the viewers home, not offer a commuter or other mobile listener an audio-on-demand or subscription service. The state of the art is therefore concerned with providing video services, not with informing a busy commuter during otherwise idle time spent in an automobile traveling to and from work.

For example, H. Brudner, Computer-Assisted Instruction Via Video Telephone, U.S. Pat. No. 3,654,708 (May 26, 1969) discloses a teaching system that uses a video telephone as a terminal. The video telephone is tied into a computer and information is fed into the video telephone, while other information is returned to the computer. A video tape recorder, containing a central bank of pre-recorded reels of video tape, is connected to the central processing unit of the computer and the video telephone, such that pictorial representations, as distinguished from the alpha-numerical representations, appear on the screen of the video telephone, enabling interaction with the student. The central bank of pre-recorded reels of video tape is connected to a buffer unit so that selected tape reels can be transfer recorded material into the buffer unit, where it is played back to the student selecting such tape. In this manner, the pre-recorded reels of video tape in the central bank are available almost simultaneously to a large number of students at different terminal units in the teaching system.

See, also, the following:

C. Coddington, J. Gold, D. Klika, D. Konkle, L. Litteral, J. McHenry, A. Richard III, PSTN Architecture For Video-On-Demand Services, U.S. Pat. No. 5,247,347 (Sep. 27, 1991), which discloses a public switched telephone network (PSTN) that provides digital video signals from a video information provider to one or more of a plurality of subscriber premises. A subscriber uses either a standard telephone instrument over the PSTN or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse control channel from the subscriber to the central office for transmission on the ISDN packet data network back to the video information provider. The interfaces also allow base band signaling and audio between the central office and the subscriber for conventional telephone instrument connectivity;

J. Fischer, K. McCalley, S. Wilson, Interactive Multimedia Presentation And Communications System, U.S. Pat. No. 5,191,410 (Mar. 2, 1993), which discloses a system for interactively and selectively communicating particular multimedia presentations to each of a plurality of subscribers along a CATV cable network. The subscriber communicates his selections, both for viewing particular presentations from a menu and for transactions with respect to the information and products being viewed, by entering codes on his Touch-Tone telephone pad. Subscriber input signals are communicated as digital signals through the intercommunications network and response signals are generated, ultimately as analog TV signals for viewing by the subscriber;

D. Rhoades, Telephone Access Information Service Distribution System, U.S. Pat. No. 5,181,107 (Jan. 19, 1993), which discloses a digital, interactive communication system designed to provide a plurality of remote subscribers with any one of a variety of stored information service software packages through the use of a home computing assembly maintained within the subscriber's home and structured to display video as well as generating audio on a standard television receiver. A bi-directional communication link is established over telephone lines between the home computing assembly and a central remote information storage center so that a selected one of the variety of information services is transmitted as a modulated carrier to the subscriber. Information service selection is controlled by a remote information storage center executive software program. Automatic billing is performed by computing equipment maintained in the remote information storage center and transmitted to a headquarters which also receives diagnostic messages associated with the remote information center and/or the associated plurality of home computing elements; and D. Rhoades, Telephone Access Video Game Distribution Center, U.S. Pat. No. 5,051,822 (Sep. 24, 1991), which discloses a digital, interactive communication system that is designed to provide a plurality of remote subscribers with any one of a plurality of stored video games or like software packages through the use of a home computing assembly maintained within the subscriber's home. The assembly is structured to display video as well as generating audio on a standard television receiver, and further incorporates the ability to use contemporary video gaming control devices for subscriber program interaction. A bi-directional communication link is established over the telephone lines between the home computing assembly and the central remote game storage center wherein the software programs are transmitted as a modulated carrier to the subscriber. Program selection is controlled by a remote game storage center executive software program. Automatic billing is performed by computing equipment maintained in the remote game storage center and transmitted to a headquarters which also receives diagnostic messages associated with the remote game center and/or the associated plurality of home computing elements.

And, also Pocock et al, U.S. Pat. Nos. 4,734,764 and 5,014,125 (a system for conveying still frame video with overlaid graphics and audio to a CATV channel during the vertical blanking interval of a television signal, including subscriber control and selection of display material via operation of a touch tone pad on a telephone); McCalley et al, U.S. Pat. No. 4,829,372 (packet transmission of digital information to a subscriber via a dedicated line/converter); Abraham, U.S. Pat. Nos. 4,567,512 and 4,590,516 (telephone subscriber request and scheduling system); Harrison, U.S. Pat. No. 4,584,603 (closed environment entertainment system including subscriber selection and control of program material); Bessler et al, U.S. Pat. No. 4,755,872 (pay for view system for use with cable system having one way addressable converters); Clark et al, U.S. Pat. No. 4,761,684 (telephone selection of video programming for cable television system); Gordon et al, U.S. Pat. No. 4,763,191 (telephone selection of video programming for cable television system); Monslow et al, U.S. Pat. No. 4,995,078 (telephone scheduling of real time video broadcast over a dedicated cable system); Lambert, U.S. Pat. No. 4,381,522 (telephone selection of video programming for viewing on a cable television system in which a directory channel displays program selections and schedules); Goodman et al, U.S. Pat. No. 5,010,399 (video transmission and control over residential phone lines); and Kleinermann, U.S. Pat. No. 4,849,811 (simultaneous transmission of audio and image frames over standard telephone lines).

Form factor of an audio on demand apparatus may probably be even more critical to the development of such an audio information distribution system than the information content provided or the pricing of such content because the success of such system depends entirely upon consumer acceptance, and consumer acceptance is tied closely to perceived utility and ease of use of the device that captures, stores, and reproduces the audio information. The device must be unobtrusive and easy to operate, yet sophisticated enough that subscribers to an audio on demand service can easily obtain and listen to desired programming. Because most people do not want to learn to program a VCR, the device must therefore be significantly easier to operate than a VCR. In fact, the device should ideally be no more difficult to use than a CD player. The device must also be able to store significant quantities of digital data and to convert such data to audio information.

The state of the art provides an interesting starting point for the design of a data storage device that may be useful for audio-on-demand services. For example, a PCMCIA card is a well defined format for a package having a connector, and that provides a way of packaging an electronic device or devices, where the package size is 75 mm long, 50 mm wide and anywhere from 3½ to 7½ to 10½ mm high. A PCMCIA card that contains a solid state or disk drive memory provides, in effect, a storage component having a particular package configuration.

Smart cards are typically used for debiting credit card accounts, and typically includes a memory, microprocessor, and data I/O.

A minidisk system offered by Sony Corporation of Japan permits recording and playback of any audio material on a 2-inch plastic disk that employs a dye laser approach to creating a miniature CD, using the same techniques as are used by CD manufacturers, and uses identical modulation and coding formats as are used by CD manufacturers. On the minidisk system, information is stored in real time and played back in real time. The system does not use data compression. Rather, it offers a straightforward approach to providing the highest possible fidelity for audio.

While video distribution systems are being developed and the video-on-demand industry proceeds apace, there is little or no effort going into delivering audio programming, even though many people spend two or more hours a day in their automobiles. Key to the success of audio on demand is consumer acceptance of the delivery and playback system. If such system is not transparent to the consumer, yet powerful enough to be fully featured, then consumers are likely to find the system too burdensome to use. Accordingly, an improved, easy to use audio program distribution system would find ready acceptance by the public.

SUMMARY OF THE INVENTION

The invention provides a device that is in part a digital replacement for an analog audio tape recorder. The device can record audio programming digitally and can play back audio programming, where such programming has been digitized and stored in data files using a variety of compression/decompression algorithms. Audio programming is stored digitally on a non-volatile medium, such as a hard drive, or in a flash EPROM, or other solid state non-volatile memory.

In contrast to such digital audio systems as Digital Audio Tape (DAT), the device herein uses a different storage medium, provides random access search ability, and stores information in accordance with various data compression algorithms. It contrast to such writeable audio storage devices as the Sony recordable mini-CD, the device herein uses a different storage medium, such as a hard drive, has intentionally limited audio bandwidth, i.e. it does not provide stereo full fidelity, and includes a novel integrated data communications protocol and data exchange port, including a modem, for automatic program material acquisition.

The invention provides two methods for a person using the device to obtain program material:

Through a digital data storage cartridge, which is the digital equivalent of a tape cassette, and in one preferred embodiment of the invention is a removable cartridge;

Through an electronic data transfer from a variety of sources such as a cable TV broadcasting system having an appropriate data transmission system.

The device uniquely combines the remote data access capability resident in a personal computer with a set of tailored, streamlined control functions to simplify, automate, and render seamless the process of selecting audio program material; ordering the program material from a service; receiving acknowledgment of the order and receiving the program material via automatic download for storage in a hard drive; playback of the program material when and where the user desires, with fully streamlined control functions; and control of the user interface functionality on the keyboard through a setup mode of operation.

DETAILED DESCRIPTION OF THE INVENTION

In its broadest application, the invention provides a device that is a digital replacement for an analog audio tape recorder. The device is able to record audio programming digitally and play back audio programming that has been digitized, where such audio information is stored in data files using a variety of known compression/decompression algorithms. Audio programming is stored digitally on a non-volatile medium, such as a hard drive, or in a flash EPROM, or other solid state non-volatile memory.

In contrast to such digital audio systems as Digital Audio Tape (DAT), the device herein uses a different storage medium, provides random access search ability, and stores information in accordance with various data compression algorithms. It contrast to such writeable audio storage devices as the Sony recordable mini-CD, the device herein uses a different storage medium, such as a hard drive, has intentionally limited audio bandwidth, i.e. it does not provide stereo full fidelity, and includes a novel integrated data communications protocol and data exchange port, including a modem, for automatic program material acquisition.

The invention provides two methods for a person using the device to obtain program material:

Through a digital data storage cartridge, which is the digital equivalent of a tape cassette, and in one preferred embodiment of the invention is a removable cartridge;

Through an electronic data transfer from a variety of sources such as a cable TV broadcasting system having an appropriate data transmission system.

Other alternative embodiments of the invention allow one using the device to obtain program material through a digital direct broadcasting satellite system, such as is offered by DirecTV, a high speed data transmission service over telephone lines using the ISDN data capability known as 2B1Q, and lower speed connections via ordinary telco modems to Internet-served databases. It is anticipated that one may also take advantage of higher speed successor technology that should become available as part of video on demand services from such vendors as telephone companies and cable television companies. Finally, it is expected that reception from a wireless system based on direct broadcast terrestrial links is likely when AM/FM radio signals are transmitted in a digital format, and as other high speed communication links become available, such as the Personal Communications Systems/Networks recently authorized by the FCC.

The device herein disclosed is similar to a dedicated personal computer, complete with a hard drive, modem for connection to a data base via an on-line service, keyboard, video display, and audio system. However, the device uniquely combines the remote data access capability resident in a personal computer with a set of tailored, streamlined control functions to simplify, automate, and render seamless the process of:

Selecting audio program material;

Ordering the program material from a service;

Receiving acknowledgment of the order and receiving the program material via automatic download for storage in a hard drive;

Playback of the program material when and where the user desires, with fully streamlined control functions; and Control of the user interface functionality on the keyboard through a setup mode of operation.

Figure 1:
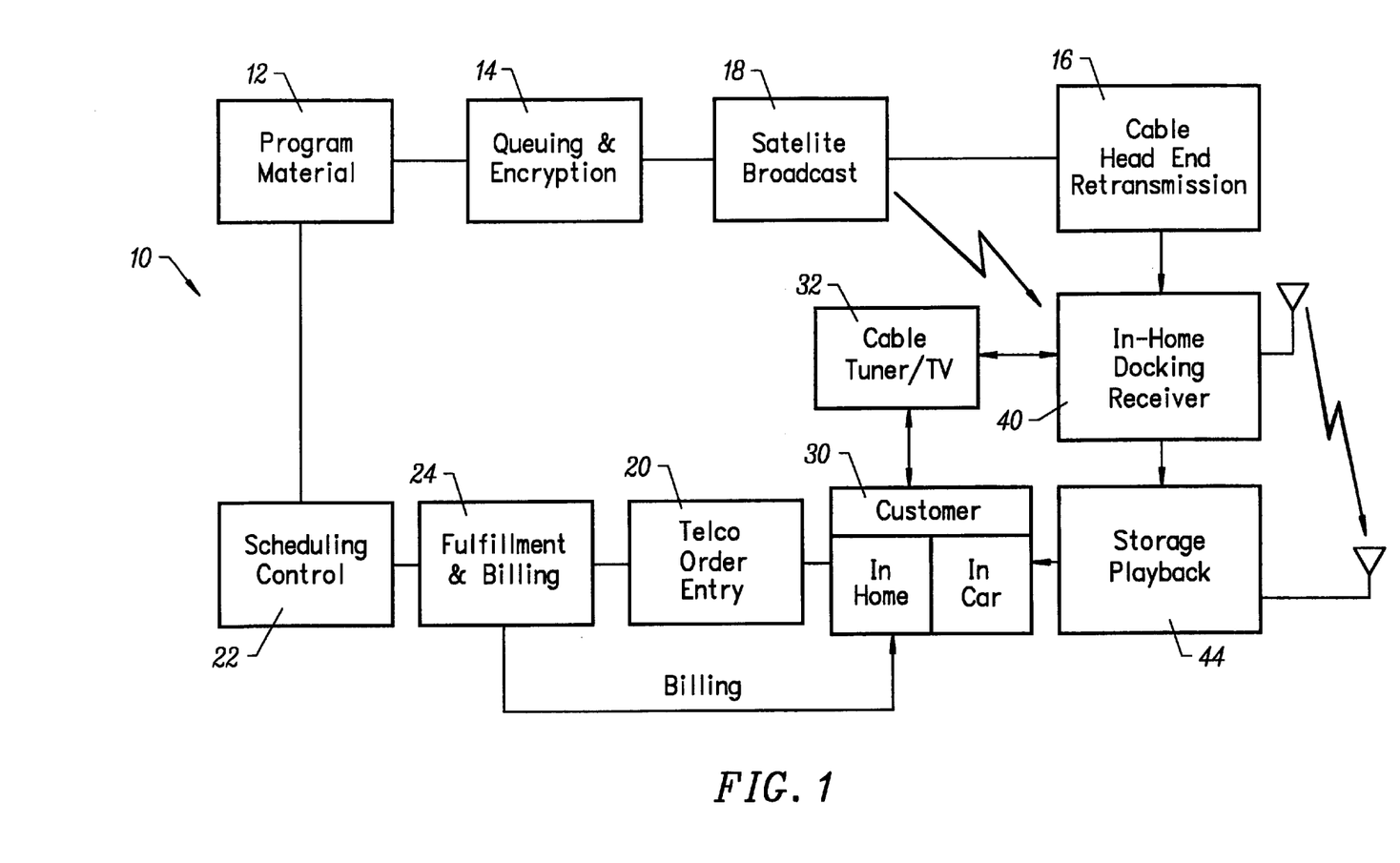
FIG. 1 is a block level schematic diagram of a subscription/on-demand information delivery system according to the invention.

FIG. 1 is a block level schematic diagram of a subscription/on-demand information delivery system according to the invention. Such system is disclosed in part in the following copending patent applications, both of which are commonly assigned to Information Highway Media Corporation, the assignee of the present application, and both of which are fully incorporated herein by reference: N. Schulhof, J. Janky, System For Distributing Subscription and On-Demand Audio Programming, U.S. patent application Ser. No. 08/279,243, filed Jul. 21, 1994; and N. Schulhof, J. Janky, Apparatus For Distributing Subscription and On-Demand Audio Programming, U.S. patent application Ser. No. 08/279,244, filed Jul. 21, 1994.

As shown in FIG. 1, the invention operates in a system that allows a subscriber to:

Select audio program material from a remotely located library;

Make the selection when he wishes to;

Receive the material via a variety of communications means at a rate much faster than real time, such that it is not necessary to wait very long to receive the program material; and Transport the stored program material to a vehicle or other location for playback in a suitable mechanism;

Perform playback at any desired time.

Thus, the invention herein disclosed is particularly well suited for use in a system that provides a very rich variety of program material via a wide-band high speed information channel for storage on a subscription and/or on-demand basis available from a much wider range of sources than is currently feasible on cable to the subscriber, and for use when desired. The invention is also intended for use in a system that transfers selected program material over a high speed data link at a rate much faster than real time.

The system 10 includes a library of program material 12, that contains a plurality of audio program materials stored in a digital format. The library may be implemented in any known digital storage technology, for example as a plurality of digital storage media, such as ultra fast hard drives. Program material may be introduced into the library from a variety of sources (not shown) that may be delivered electronically over a variety of data communications media at high speed from a plurality of locations, for example via modem transfer from a distributor, such as the Wall St. Journal.

It is anticipated that one important use of the invention is in conjunction with a subscription service. For example, a daily newspaper, such as the Wall St. Journal or the New York Times, may be transcribed each morning into an audio version, that is then digitized and delivered to the library. In this way, the library may provide daily delivery of a morning newspaper in audio format that allows a subscriber to listen to the news in a way that the news is not interrupted by commercial breaks and is not truncated to fit into a tight broadcast schedule.

The program distribution system enables a subscriber to select desired programs, and to be charged for the service. The program distribution system includes a scheduling control module 22 that selects a series of stored program materials from the library 12 via a telco order entry module 20. The subscriber is billed for selected program materials by a fulfillment and billing module 24. Program selection may be made over a telephone line, as in shown in the prior art, or it may be made from the customer/subscriber location 30 and/or a standard interactive cable television converter 32. Orders placed by the subscriber are routed via a cable television system, or from residential phone lines via the telco order entry module 20.

Figure 2:
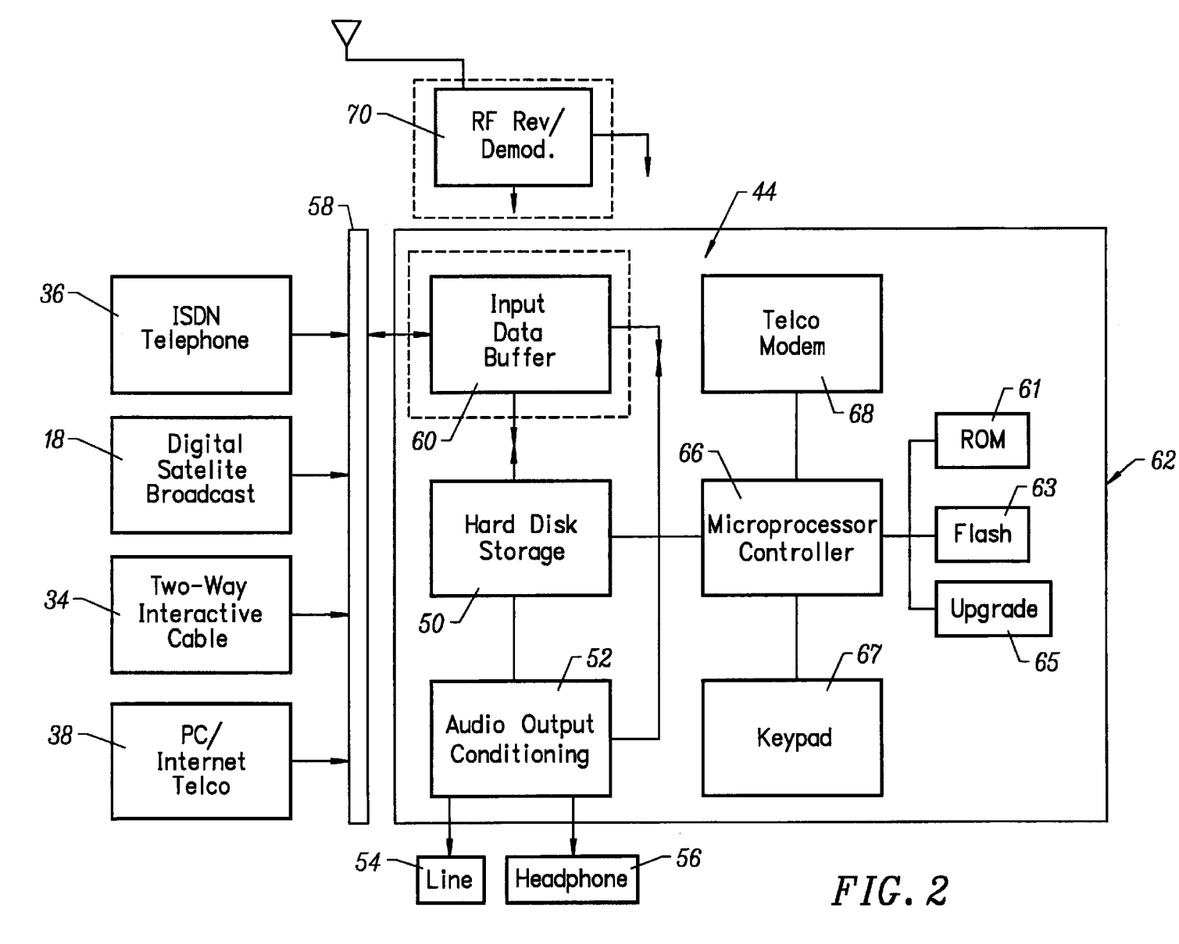
FIG. 2 is a block level schematic diagram of a portable storage/playback apparatus having a universal data interface according to the invention.

The actual program material delivery system may be chosen to take advantage of an existing regional infrastructure. The system is well suited for such delivery means as cable television 16, interactive cable (34; FIG. 2), pay-per-view (not shown), telephone (38; FIG. 2) or ISDN (36; FIG. 2), and satellite distribution 18. Examples of such distribution vehicles, as well as new and emerging forms of distribution are discussed in D. Deloddere, W. Verbiest, H. Verhille, Interactive Video On Demand, IEEE Communications (May 1994); R. Jones, Baseband and Passband Transport Systems for Interactive Video Service, IEEE Communications (May 1994); and P. Baran, Satellite Communications System and Apparatus, U.S. Pat. No. 4,455,651 (Jun. 19, 1984).

During data transmission, program materials are transferred from the library at rates faster than those corresponding to real time playback rates for delivery via a queuing and encryption module 14 to a series of high speed data transmission systems, such as a satellite broadcast system 18. The broad band high speed data transmission system may also include a local delivery module that is similar those that are currently used for video program delivery to cable television head ends 16, except that in the system herein the program material is subsequently delivered in digital high speed format to an individual subscriber's home.

The transmission system routes the selected program material to the subscriber's residence via any known means, such as a cable television system 16, or the program material may be routed directly to the subscriber via satellite broadcast 18, as discussed above. Once received at the subscriber's residence, the standard cable television converter 32 routes the program material to a docking interface device 40. Alternatively, the cable system may be coupled directly to the docking interface device. The cable converter 32 and television set may then be selectively coupled to the cable system via control circuitry in the docking interface device 40.

FIG. 2 is a block level schematic diagram of a portable storage/playback apparatus having a universal data interface according to the invention. The invention herein resides in a portable program storage/playback system 44 that provides a specialized set of interrelated subsystems that together capture the selected audio program material, store the program material, and enable selective playback of the stored program material in a mobile environment, such as an automobile. Once program materials are stored on the storage medium 50, a playback system 52 permits the stored program material to be played back in real time, for example over the AM/FM radio in an automobile via a line output 54 or through a speaker or pair of headphones 56.

More particularly, the system 44 comprises a digital data storage means, such as a hard disk drive 50 that is in communication with a universal communications interface 58 via an input data buffer 60. The universal communications interface 58 may be connected to a plurality of data sources, such as an ISDN telephone line 36, a digital satellite broadcast system 18, a two-way interactive television cable 34, and an Internet or other data source as may be supplied over standard telephones services 38.

Thus, data connections and sources to which the system is adapted include a telco modem system connected via a standard telephone system to an Internet access connection, either directly or through a personal computer; a specialized data modem for use with a cable TV system; a direct broadcast satellite digital television receiver system; a specialized modem for use with the telephone system known as an ISDN data link. Appropriate communications protocols are stored in a system memory 62, which may include a read only memory 61, flash memory 63, or other memory, such as an upgrade memory 65, or the communications protocols may be stored on the hard disk drive 50. Such protocols are accessed as appropriate under control of a microprocessor 66.

The microprocessor 66 controls storage and data retrieval functions, provides communications interface control to the high speed sending data source, provides communications interface control to a bidirectional low speed source, supervises order entry functions and order placement, and controls digital to audio conversion functions for playing back an audio program stored in a data file. The microprocessor 66 comprises a series of standard microprocessor elements that store a series of executable subroutines, for example in a read only memory 61, as discussed above.

The microprocessor 66 is connected to an interactive controller, such as a keypad 67, that allows external control of the system by a user. The microprocessor is also connected to an output system that includes an audio output and conditioning module 52 that is operable to deliver audio signals that are developed from data files stored on the hard disk drive, or on other storage means.

Finally, the microprocessor is also connected to a built in telco modem 68. The modem is used to make a direct connection to a telco-based order entry system that accepts previously entered user requests from the keypad that are stored in the system memory. It is expected that as modem speeds over telephone lines increase, the modem can be used to retrieve the programs ordered. In the presently preferred embodiment of the invention, a second modem is needed, which is not part of the system per se. The reason for a separate order entry modem has to do with speed because order entry can be low speed, but program transmission must be high speed if it is to be done in a timely manner. Further, while it may be possible to obtain material from more than one source, order entry is preferably performed by phone.

In an alternative embodiment of the input data buffer 60 is a PCMCIA-type format card that includes either or both of the universal communications interface 58 and the telco modem 68. Alternatively, an RF receiver/demodulator, either hardwired or in a PCMCIA-type format, may be used for wireless communication for either or both of program ordering and program reception. As shown in FIG. 1, such wireless communication with the system 44 may be with a local receiver 40 that is coupled to a cable television or other such service. In this way, the system may be left on a desk or in a car and automatically loaded with program information when not in use. Another embodiment of the invention situates the telco order entry modem as a part of the receiver 40 (FIG. 1) which is connected to a cable television system 16.

In yet another embodiment of the invention, the input data buffer may include an audio input/digitizer circuit for digitizing live audio and then storing it, as in a conventional tape recorder or mini-CD recorder or DAT recorder.

The system 44 accepts digital data from a plurality of sources according to prearranged formats for both the data structure and the physical interface; controls the storing process in a digital data storage device; responds to commands initiated from the keypad 67 to execute various functions, including playback of audio programming that has been stored in a digital format in a file, and entering of catalog numbers of programs to be ordered; and responds to specialized commands for reconfiguration of operating modes, according to a pre-arranged series of options.

The system may be operated in any of at least four user-selectable modes:

1. Initial Mode: User Setup/Order Entry By User.

Figure 3:
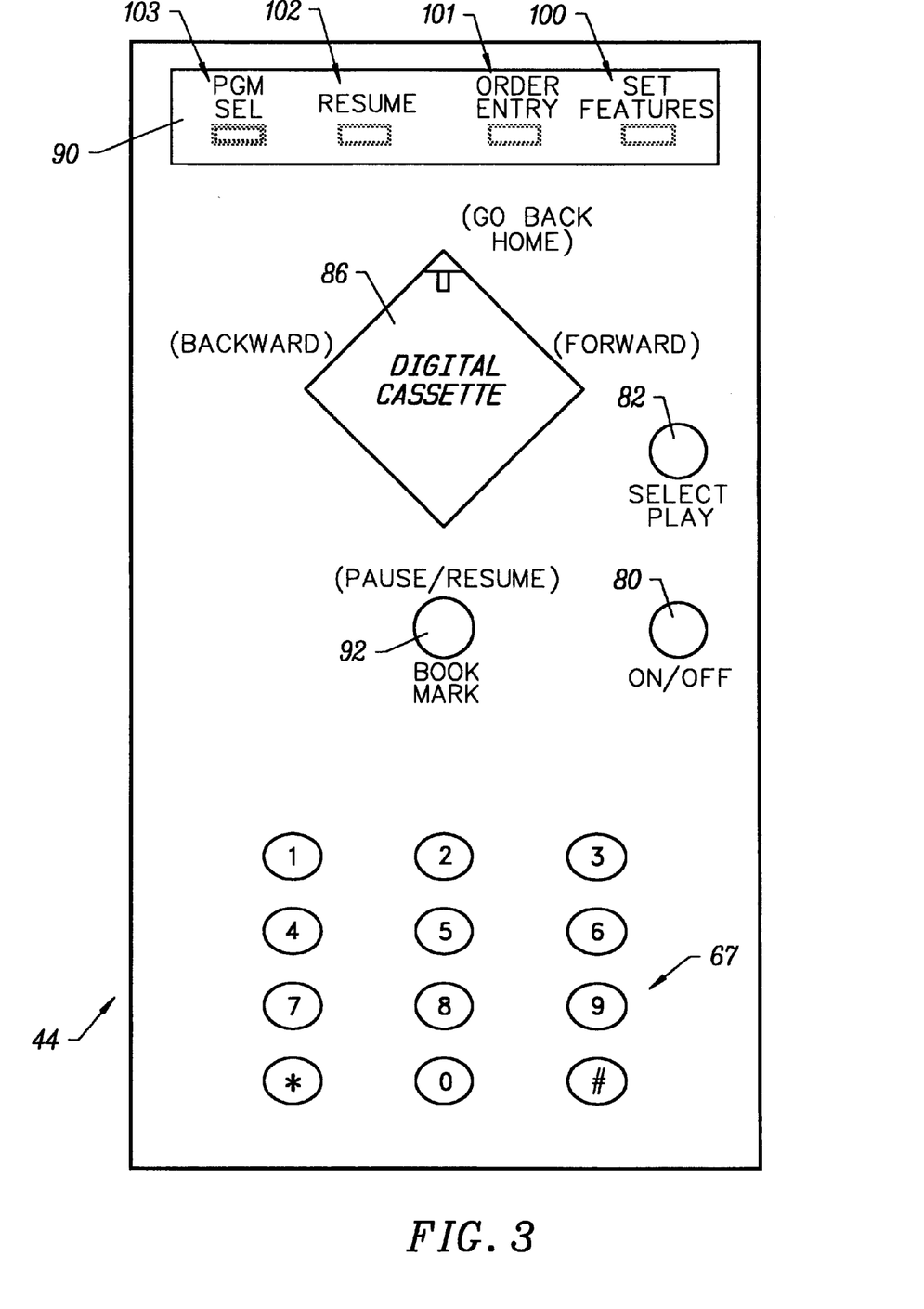
FIG. 3 is an illustration of the portable storage/playback apparatus, showing an initial mode of operation according to the invention.

FIG. 3 is an illustration of the portable storage/playback apparatus, showing an initial mode of operation according to the invention. In the user setup mode, the user can configure the system to follow certain canonical paths through a built-in menu system, or the user may execute immediate jump-to commands. In this mode, the user can also configure the system for the desired communications access, and may also enter a personal user profile of automated features. In this way, the user may create an intelligent agent that automatically services the user's order and retrieval needs. For example, if the user is interested in listening to all regularly published information on a particular topic, the agent can be programmed to collate all such information for the user's review.

When the user wishes to make a selection for a next download of program material, he activates the system by pressing an ON/OFF switch 80, and then may set a profile of features 100 for the system and/or select an Order Entry mode 101, as displayed on a LCD display 90, using a select key 82. The user next copies order entry numbers from a catalog or schedule into the system via the keypad 67, marking the end of each selection with a pound sign # or a star sign *. The new requests are then stored in either solid-state memory 62 or hard drive memory 50 in the system until they are transferred to an order service center upon activation of an order entry mode. At any time during this operation, the user may pause and thereafter resume operation of the system by pressing a Pause/Resume button 92. Pause and resume modes of operation are indicated on the display 90 by a RESUME indicator 102.

Figure 4:
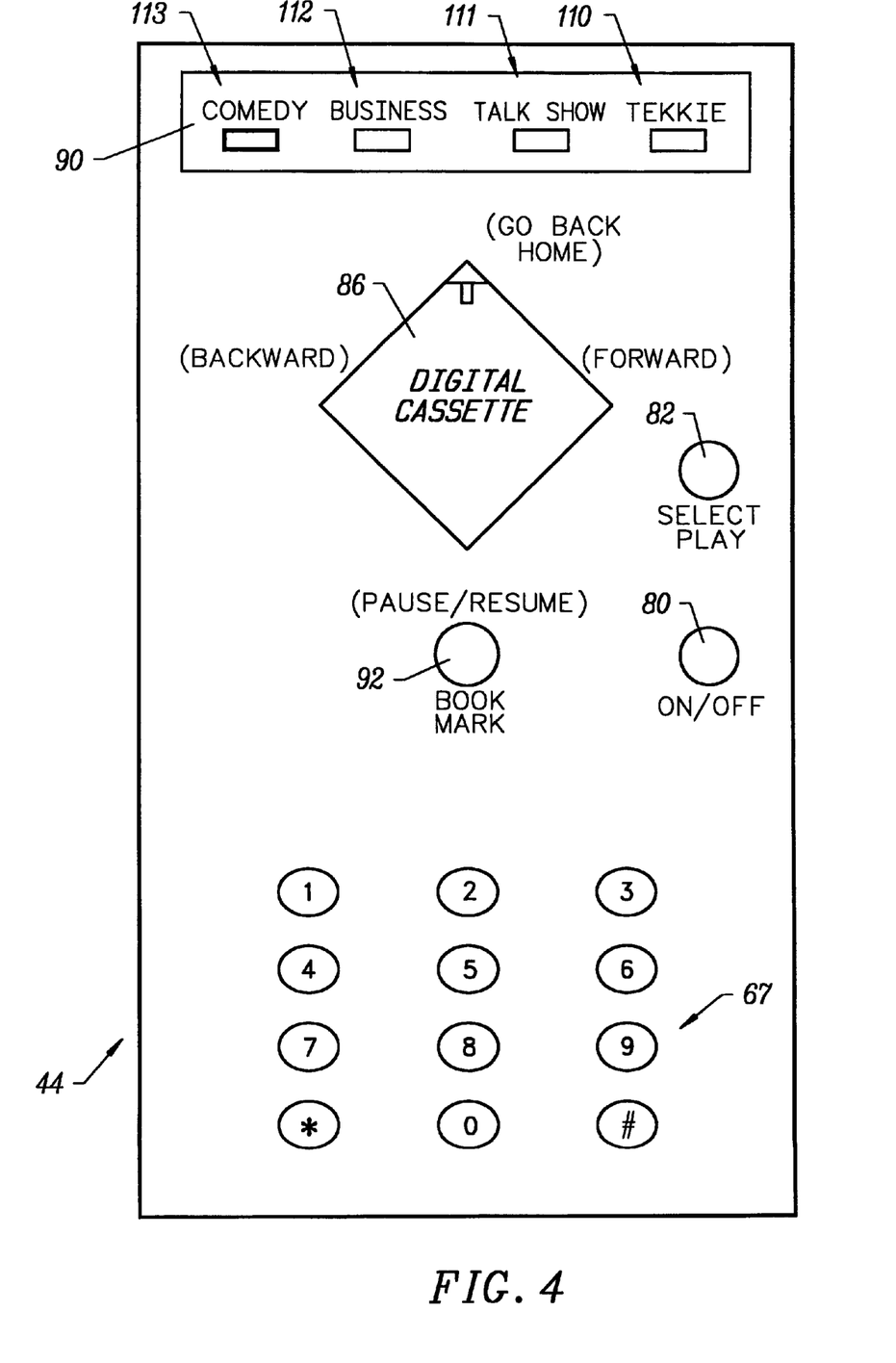
FIG. 4 is an illustration of the portable storage/playback apparatus, showing an information order/select mode of operation according to the invention.

FIG. 4 is an illustration of the portable storage/playback apparatus, showing an information order/select mode of operation according to the invention. The information order/select mode allows the user to browse selectively through various program categories and then through program files within each category by reading descriptions for both the categories and the titles in a display and/or by listening to the descriptions, as the descriptions are converted to audio information that is suitable for conveyance to any of a number of audio systems, including the automobile stereo cassette system, another portable audio playback system, or a audio speaker system attached to the digital cassette. The audio mode of information retrieval and selection is considered especially helpful for persons who cannot read, such as young children, and for visually impaired persons. It is also a benefit to a person operating an automobile, who cannot afford to be distracted by trying to read a display.

Thus, when this mode is selected, the display 90 is used in conjunction with a four position control switch 86 to navigate through a hierarchical or otherwise organized database of program material. In the figure, the materials shown organized in four categories, i.e. Tekkie 110, Talkshow 111, Business 112, and Comedy 113. The control switch may be used to navigate through a database hierarchy by pressing forward and backward to move up or down a level within the hierarchy, and by pressing to the left or right to move within a particular level of the hierarchy. The control switch may also have a center press position that is used to make a selection; or the Select/Play button 82 may be pressed to make a selection. Additionally, the keypad 67 may be used to navigate through the program database, for example by means of keyboard shortcuts, where a particular keystroke or combination of keystrokes is assigned to a specific database location. It is expected that order placement and database browsing may take place in real time, although it is also possible to download an updated catalog containing the database of program material each time program material is transferred into the system. In this way, it is not necessary to refer to a separate catalog for a listing of program material, and the expense of printing and distributing such a catalog is eliminated.

It should be appreciated that the specific arrangement of controls and modes of operation are herein provided for purposes of disclosing the presently preferred embodiment of the invention, but that the invention is not necessarily limited to these specific examples.

2. Transaction Mode A: Automatic Order Placement By Telco Modem When Mated To An Associated Docking Station.

The docking station 40 (FIG. 1) contains a high speed modem for receipt of data, a power supply, a connection to a data source, and optionally a low speed modem for access to the order entry system 20 via the telephone system, i.e. the low speed modem may be in the docking station instead of in the system.

An control algorithm is used to establish connection to an order entry host with prescribed information exchange protocols for automatic entry of programs to be downloaded to a particular customer's system. Automatic receipt of acknowledgment is provided by host to verify that system is authorized to receive the programs ordered. Order entry and acknowledgment preferably includes an appropriate time dependent encryption/decryption keys.

3. Transaction Mode B: Automatic Receipt Of Desired Program Material Via Automatic Connection To A High Speed Data Modem, Which In Turn Is Automatically Connected To The Broadcasting Host Computer.

A modem contained in the docking station 40 (FIG. 1) physically accepts the system and makes electrical connections thereto that are suitable for receiving high speed data and for sending order entry information via a low speed modem. The docking station contain a connector for establishing electrical communication between the system and the docking station. The docking station also contains a telco modem for relaying customer identification and customer program order information. A connector between the modem and the telco system may comprise, for example either a wire to/from an RJ-11 jack, or a wireless radio modem. This mode of operation is completely integrated for automatic, seamless, and effortless operation without customer assistance or intervention.

A high speed data demodulator is also provided in the communications interface 58 for receiving desired program material from plurality of data sources, and is connected to the system to transfer the program material thereto. The high speed data demodulator may be connected to a cable television distribution cable with appropriate tuning circuits for selecting a desired data channel. The high speed data demodulator preferably operates in a signaling system in which the data to be transmitted are converted to a multilevel signal set, in which as many as four voltage levels are used to create a series of symbols, each symbol corresponding to a particular pattern of data bits, and which set is inserted into a standard NTSC/PAL/SECAM video composite signal. The demodulator preferably recovers the data from the series of symbols transmitted as video, and then delivers the data via the communications interface 58 to the data buffer 60. Alternatively, the high speed data demodulator is connected to a remote data source via a standard telephone system for communication with the subscription/audio-on-demand service via an Internet connection, or an on-line service, such as AmericaOnLine, Compuserve, or Prodigy.

In another, equally preferred embodiment of the invention, the high speed data demodulator is embodied in a telephone service known as ISDN, in which case the internal said high speed data demodulator associated with the docking station is bypassed, and data are delivered directly to the interface data buffer 60 for storage on the hard disk drive 50.

A control algorithm establishes a connection via any of the previous communications paths to a host computer system. The host computer system broadcasts audio program material in form of digital data files, and as part of an overall transmission of a catalog of available programs. The control algorithm associates program files in the broadcast data stream with identification tags by means of a header field that is attached to the beginning of each data file. The identification tags match those programs selected by the user and allow transmission of the program material to the user if a suitable enabling acknowledgment if received. The transfer of the selected files is enabled and, upon receipt by the system, the files are stored on the hard drive. Data storage is completed and the system is then ready to receive the next program in the broadcast data stream.

As discussed above, it is possible to dispense with any physical connection between the docking station and the system. Thus, program materials could be delivered to the docking system, and thence to a system in a user's automobile during the night while the user is asleep, such that the program material is ready for review during the next morning commute. Alternatively, the docking station may be dispensed with entirely and its functionality may either be integrated into the system itself, or it may be integrated into a cable system "set-top" box.

4. Transport Mode: Activation Of The Playback Mode Of Operation.

Figure 5:
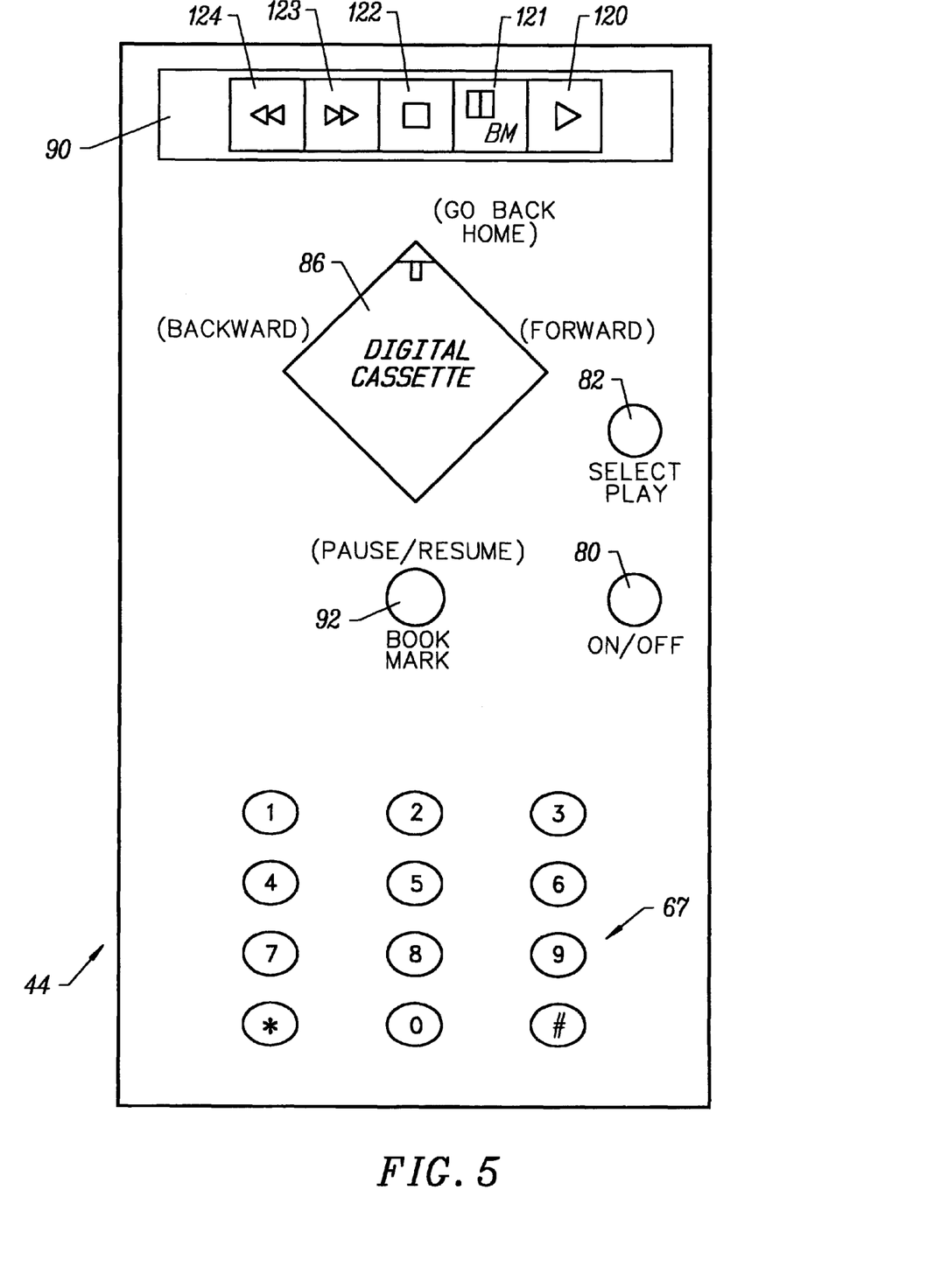
FIG. 5 is an illustration of the portable storage/playback apparatus, showing a transport mode of operation according to the invention.

FIG. 5 is an illustration of the portable storage/playback apparatus, showing a transport mode of operation according to the invention. The system may be set by the Select/Play button 82 to display a number of user activated controls, such as playback 120, pause/book-mark 121, stop 122, fast forward 123, fast rewind 124. Other features, such as bookmark and resume, are described in more detail below.

A control algorithm supervises conversion of program material files that are stored on the hard drive from a highly compressed data format to audio via the audio output and conditioning module 52, as discussed above. The data are retrieved from the hard drive and converted to audio via any of a number of suitable well known algorithms, such as those defined by the Motion Pictures Experts Group (MPEG) in various embodiments, such as MPEG-1, layers 1, 2, or preferably layer 3, which is a 32 kilobit/second version, and subsequent versions, such as MPEG-2, as dictated by the format of the data retrieved. The algorithm may also include a decryption capability to decrypt and/or decompress the program material files, if the files are encrypted/compressed. Compression may take any standard form, for example the program material files may be sent as compressed ASCII text files, such that written materials may be sent via the subscription service after they are scanned into a computer. The text files are then converted to audio by the system using a text to speech algorithm (see, for example A. Milewski, Facsimile-To-Speech System, U.S. Pat. No. 5,091,931, Feb. 25, 1992). In this way, it is not necessary to have textual material, such as a newspaper, converted into speech prior to distribution to a subscriber.

Another feature of the invention is the provision of an automatic data format recognition system that determines to which service the system is connected, and that then implements the correct communications protocol for that service. The key to this technique is to include an identification marker in the header of each packet that identifies the subsequent format. Such a header could consist of a number in a particular field reserved for this use. The number used is predefined to represent a particular format. For example, the number "01" in a specified field could mean "use PEG-1 Layer 3 to decode this data." The number "02" could mean "use G.722 to decode this data." At the data link level, another field can describe the basic data setup for parity, number of bits/character, and number of stop bits, such as "N81," which is commonly used to indicate No parity, 8 bits, and 1 stop bit. Many other configurations are employed, but in the interest of creating standards, such companies as Apple Computer of Cupertino, Calif. have embedded the above standard in their product offering, e.g. Apple Remote Access, as a means to simplify the user setup activity. The technique involved herein extends that capability beyond a single setup to acomodate a plurality of other such setups automatically.

The invention herein therefore provides a system that operates under supervision of a microprocessor, and that includes a hard disk drive, a communications interface, a connection to an audio channel, and a keypad. The system is intended to collect data from a plurality of sources in a variety of formats, all of which may be reproduced as an audio signal. The system uniquely provides an automatic method for absorbing data from a variety of sources, recognize the source to which it is connected, and determine how to go ahead and implement a correct protocol.

With regard to data compression, one important feature of the invention is the fact that information is loaded into device at a faster than real time rate, and thereafter reproduced at real time rate. The compression algorithms used in the herein described system are similar (or may be identical) to those developed the Motion Picture Experts Group, referred to as MPEG1 and MPEG2. Other known compression algorithms include G.722, pioneered by AT&T. Such compression techniques provide specific algorithms in which audio is digitized and then compressed a great deal. Maximum compression achieved to date for listenable programming is on the order of 6 to 6½ kilobits. Typical compressed but high-quality audio data rates lie somewhere between 16 and 32 kilobits per second.

The invention uniquely exploits current development of fast, e.g. 10 megabit, delivery systems that are necessary to deliver video material. The inventor herein has recognized and applied to advantage the superiority of compressed audio versus compressed video, where the data transfer capability is about three orders of magnitude greater for compressed audio. While it takes a significant amount of data to make an ordinary picture on a television screen, e.g. about two megabytes, an equivalent amount of bandwidth, when used for audio programming, could easily contain 10 to 20 minutes worth of program material. Thus, the invention herein takes advantage of the overlooked fact that audio is $\frac{1}{1000}$ as data intensive as video.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A portable audio information storage/playback apparatus, comprising:

a data interface;

a microprocessor, wherein said microprocessor operates in response to user operation of said keypad to select audio program material; receive said program material via automatic download for storage in a storage medium; and playback said program material when and where the user desires; and said storage medium controlled by said microprocessor and on which audio programming received via said data interface may be recorded digitally in a faster than real time format and from which said audio programming may be retrieved for reproduction in a real time format, where such audio programming is provided in the form of digitized, compressed data files; and an audio output and conditioning module for reproducing said retrieved audio programming in real time.

2. The apparatus of claim 1, further comprising:

a storage device for storing said received audio programming;

a modem for connection to a data base via an on-line service from which said audio programming is obtained on a subscription or on-demand basis;

a keypad for effecting control of said apparatus in any of one or more modes of operation; and a display for visually indicating current apparatus mode of operation.

3. The apparatus of claim 2, further comprising:

a built in telco modem for establishing a direct connection to a telco-based order entry system that accepts previously entered user requests from said keypad that are stored in said memory.

4. The apparatus of claim 1, said data interface further comprising:

an input data buffer, wherein said data interface is adapted for connected to any one or more of a plurality of data sources, including an ISDN telephone line, a digital satellite broadcast system, a two-way interactive television cable, and an Internet or other data source as may be supplied over standard telephones services.

5. The apparatus of claim 4, wherein said microprocessor implements a plurality of communications protocols, such that said protocols are accessed as appropriate for establishing a data exchange between said apparatus and any one or more of a plurality of said data sources.

6. The apparatus of claim 4, wherein said input data buffer is a PCMCIA-type format card that includes either or both of said data interface and a telco modem.

7. The apparatus of claim 4, wherein said input data buffer further comprises:

an RF receiver/demodulator, either hardwired or in a PCMCIA-type format, for wireless communication for either or both of program ordering and program reception.

8. The apparatus of claim 4, wherein said input data buffer further comprises:

an audio input/digitizer circuit for digitizing live audio and then storing it.

9. The apparatus of claim 1, wherein said microprocessor controls storage and data retrieval functions, provides communications interface control to a high speed sending data source, provides communications interface control to a bi-directional low speed source, supervises order entry functions and order placement, and controls digital to audio conversion functions for playing back an audio program stored in a data file.

10. A portable audio information storage/playback apparatus, for use in a system for distributing subscription and on-demand audio programming, that includes a library containing a plurality of audio program materials stored in a digital format; a program selection module that allows a subscriber to request program materials contained within said library; an information request manager that selects program materials chosen by said subscriber from said library and that forwards said selected program material to a data transmission system for distribution to the subscriber at rates faster than real time, the apparatus comprising:

a data interface;

a microprocessor, wherein said microprocessor controls said apparatus to accept digital data according to pre-arranged formats with regard to both data structure and physical interface; controls the storing process in a storage device; responds to commands initiated from said keypad to execute selected functions, including at least one of playback of audio programming that has been stored in a digital format in a file, and entering of catalog numbers of programs to be ordered; and responds to specialized commands for reconfiguration of operating modes, according to a pre-arranged series of user options;

said storage device controlled by said microprocessor and on which audio programming received via said data interface may be recorded digitally in a faster than real time format and from which said audio programming may be retrieved for reproduction in a real time format, where such audio programming is provided in the form of digitized, compressed data files;

an audio output and conditioning module for reproducing said retrieved audio programming in real time;

means for connection to said library via an on-line service from which said audio programming is obtained on a subscription or on-demand basis;

a keypad for effecting control of said apparatus in any of one or more modes of operation; and a display for visually indicating current apparatus mode of operation.

11. The apparatus of claim 10, wherein said apparatus may be operated in any of:

a user setup mode, in which a user can:
configure the apparatus to follow selected canonical paths through a built-in menu system;
execute immediate jump-to commands;
configure the apparatus for desired communications access; and
enter a personal user profile of automated features;

an order entry mode, in which a user can:
make a selection for a next download of program material;
set a profile of features for the system; and/or
navigate through said order entry mode, as displayed on said display, using a select key;
pause and thereafter resume operation of the apparatus by pressing a pause/resume button;

an information order/select mode, in which a user can:
browse selectively through various program categories and then through program files within each category by reading descriptions for both the categories and the titles in a display and/or by listening to the descriptions, as the descriptions are converted to audio information that is suitable for conveyance to an audio system;

a first transaction mode, in which a user can:
perform automatic order placement by telco modem when said apparatus is mated to an associated docking station that includes a high speed modem for receipt of data, a power supply, a connection to a data source, and optionally a low speed modem for access to an order entry system via a telephone system;

a second transaction mode, in which a user can:
automatically receive desired program material via automatic connection to a high speed data modem, which in turn is automatically connected to a broadcasting host computer, wherein said high speed modem is contained in a docking station that physically accepts the apparatus and makes electrical connections thereto that are suitable for receiving high speed data and for sending order entry information via a telco modem or a wireless radio modem; and a transport mode, in which a user can:
set said apparatus with a select/play button to display a number of user activated controls, such as playback, pause/bookmark, stop, fast forward, fast rewind, and resume.

12. The apparatus of claim 10, wherein said microprocessor is operable to in response to a user to create an intelligent agent that automatically services the user's order and retrieval needs.

13. The apparatus of claim 10, further comprising:
a multiple position control switch for navigating through a hierarchical or otherwise organized database of program material, and wherein said control switch may also be used to make a program material selection.

14. The apparatus of claim 10, said microprocessor further comprising:
a control algorithm for establishing connection to an order entry host with prescribed information exchange protocols for automatic entry of programs to be downloaded to a particular customer's system, wherein automatic receipt of acknowledgment is provided by said host to verify that apparatus is authorized to receive the programs ordered, and wherein order entry and acknowledgment preferably includes an appropriate time dependent encryption/decryption keys.

15. The apparatus of claim 10, said data interface further comprising:
a wireless modem, wherein program materials are delivered directly to said apparatus.

16. The apparatus of claim 10, said data interface further comprising:
a high speed data demodulator for receiving desired program material from plurality of data sources, said high speed data demodulator being adapted for connection to a cable television distribution cable, wherein said high speed data demodulator operates in a signaling system in which data to be transmitted are converted to a multilevel signal set, in which a plurality of voltage levels are used to create a series of symbols, each symbol corresponding to a particular pattern of data bits, and which set is inserted into a standard NTSC/PAL/SECAM video composite signal, wherein said demodulator recovers the data from the series of symbols transmitted as video, and then delivers the data via a communications interface to said data buffer.

17. A portable audio information storage/playback apparatus, for use in a system for distributing subscription and on-demand audio programming, that includes a library containing a plurality of audio program materials stored in a digital format; a program selection module that allows a subscriber to request program materials contained within said library; an information request manager that selects program materials chosen by said subscriber from said library and that forwards said selected program material to a data transmission system for distribution to the subscriber at rates faster than real time, the apparatus comprising:

a data interface;

a microprocessor for supervising control of said apparatus to establish a connection via a selected communication path to a host computer system that broadcasts audio program material in form of digital data files as part of an overall transmission of a catalog of available programs, to associate program files in a broadcast data stream with identification tags by means of a header field that is attached to a beginning of each data file, said identification tags matching those programs selected by a user to allow transmission of program material to the user if a suitable enabling acknowledgment is received, wherein transfer of the selected files is enabled and, upon receipt by the apparatus, the files are stored;

a storage device controlled by said microprocessor and on which audio programming received via said data interface may be recorded digitally in a faster than real time format and from which said audio programming may be retrieved for reproduction in a real time format, where such audio programming is provided in the form of digitized, compressed data files;

an audio output and conditioning module for reproducing said retrieved audio programming in real time;

means for connection to said library via an on-line service from which said audio programming is obtained on a subscription or on-demand basis;

a keypad for effecting control of said apparatus in any of one or more modes of operation; and a display for visually indicating current apparatus mode of operation.

18. The apparatus of claim 17, wherein said microprocessor implements a control algorithm that supervises conversion of stored program material files from a highly compressed data format to audio via said audio output and conditioning module, wherein said algorithm may also include a decryption capability to decrypt and/or decompress the program material files, if the files are encrypted/compressed, wherein said program material files may optionally be sent as compressed text files that are converted to audio by the apparatus using a text to speech algorithm.

* * * * *